Feb. 22, 1966    W. F. MAYER    3,236,338
APPARATUS FOR BRAKING AN AIRCRAFT UPON LANDING
Filed Oct. 6, 1961    3 Sheets-Sheet 1
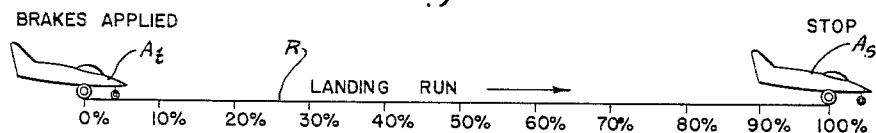
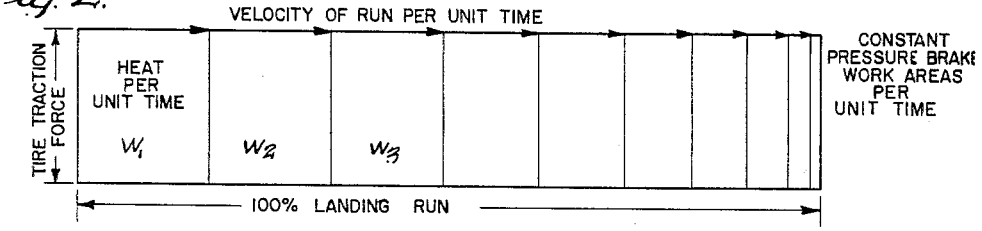
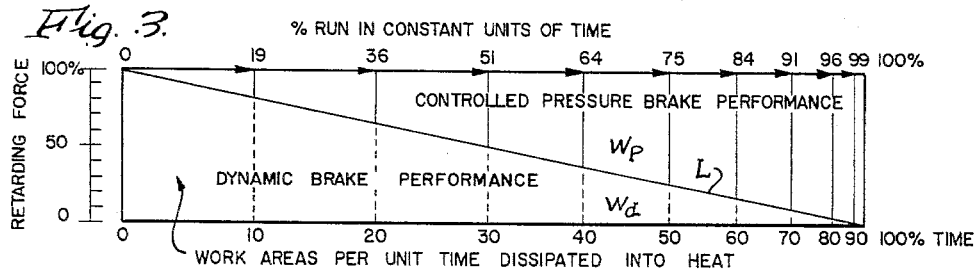
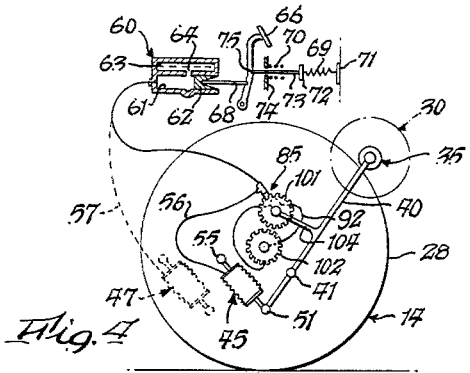
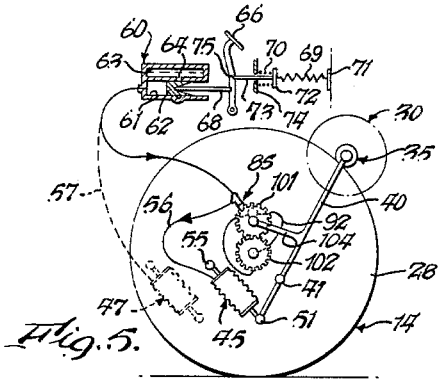
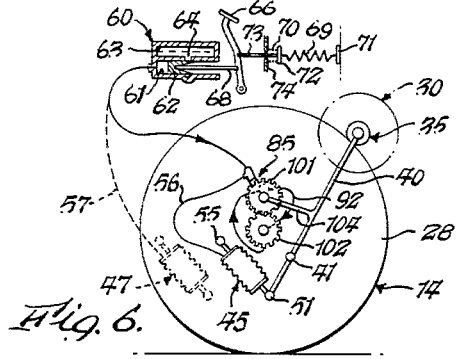
INVENTOR
WALDEMAR F. MAYER
BY Popp and Sommer
ATTORNEYS

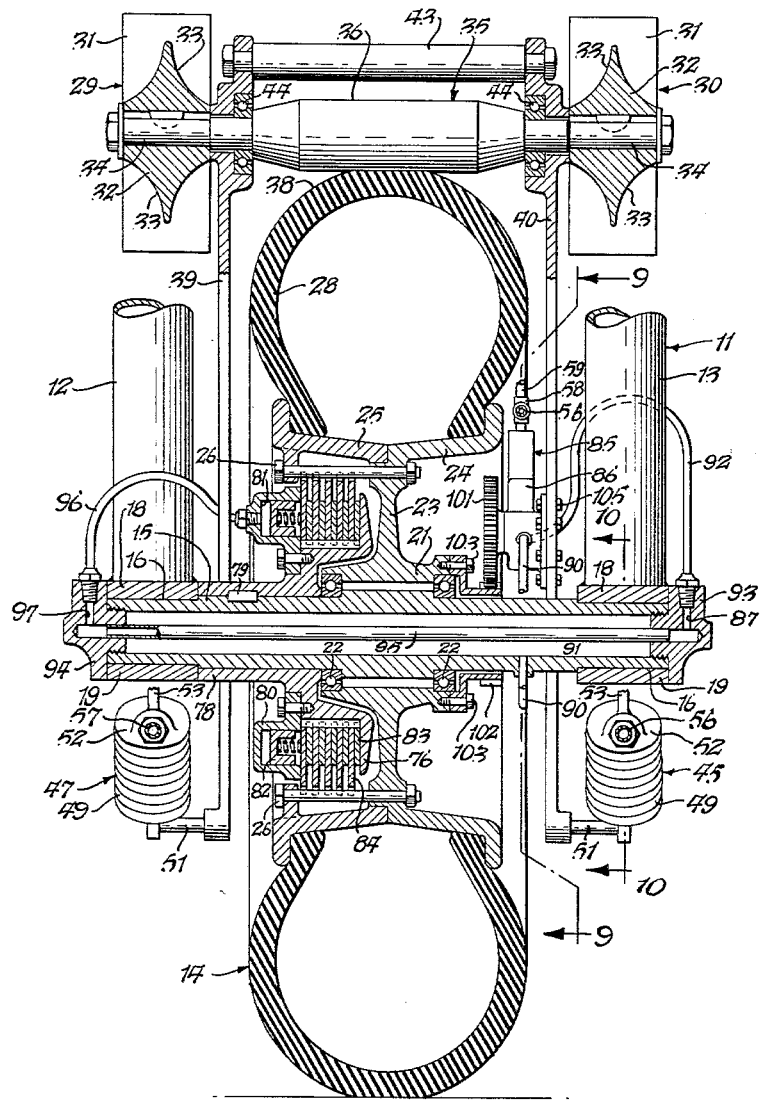

Feb. 22, 1966 W. F. MAYER 3,236,338
APPARATUS FOR BRAKING AN AIRCRAFT UPON LANDING
Filed Oct. 6, 1961 3 Sheets-Sheet 3

INVENTOR
WALDEMAR F. MAYER
BY Popp and Sommer
ATTORNEYS.

United States Patent Office 3,236,338
Patented Feb. 22, 1966

3,236,338
APPARATUS FOR BRAKING AN AIRCRAFT UPON LANDING
Waldemar F. Mayer, Park Ridge, N.J., assignor, by direct and mesne assignments, of one-half to Dresser Industries, Inc., Dallas, Tex., a corporation of Delaware, and one-half to The Goodyear Tire & Rubber Company, Akron, Ohio, a corporation of Ohio
Filed Oct. 6, 1961, Ser. No. 143,442
9 Claims. (Cl. 188—86)

This invention relates to a method and apparatus for braking an aircraft upon landing.

Since many aircraft now touchdown with such a high landing speed, braking problems of major proportions are presented. If friction brake mechanisms are relied upon solely to slow down and eventually stop such an aircraft within a reasonable length of runway, these mechanisms are subjected to unusual strain. To reduce this strain by allowing more roll-out requires excessively long runways and this is an undesirable solution to the problem.

The primary object of the present invention is to provide a method and apparatus for braking an aircraft upon landing which will utilize the full tire traction force so that the aircraft can be stopped without skidding within a minimum length of runway.

The concept of the present invention contemplates the provision of two types of brakes for an aircraft, a dynamic brake and a pressure operated friction brake, which are operated in such manner that the performance of one complements the other and maximum advantage is taken of the favorable attributes inherent in each without subjecting either to abusive treatment.

This is achieved by controlling only the effectiveness of the pressure brake while the dynamic brake, which is operated substantially simultaneously, remains uncontrolled during the landing roll of the aircraft. Expressed another way, the dynamic and pressure brakes are placed into operation substantially simultaneously upon touchdown but the pressure brake is operated with substantially linearly increasing pressure to compensate for the fade-out of braking effort of the dynamic brake due to decrease in runway speed of the aircraft.

The dynamic brake loses its effectiveness with the square of the diminishing landing run speed while the length of run increases with the square root of the landing speed. Consequently, the two effects resolve in a constantly diminished retardation effect during the landing travel. The initial braking effect of the dynamic brake depends on the touchdown spin-up of the tire speed. The landing run length will be longer with high speed touchdown. Thus, the feeding of a pressurized operating fluid to the friction brake should be at a slow rate initially.

Other objects and advantages of the invention will be apparent from the following detailed description of a preferred embodiment thereof illustrated in the accompanying drawings wherein:

FIG. 1 is a schematic view depicting the length of run required for an aircraft from the place of application of the brakes to a complete stop.

FIG. 2 is a diagram depicting the amount of work performed per unit time by a constant pressure brake and with no dynamic brake being utilized.

FIG. 3 is a diagram depicting the division between work performed by a pressure brake and also a dynamic brake in accordance with the concept of the present invention.

FIG. 4 is a schematic view of the inventive apparatus embodying dynamic and pressure brakes and illustrating the apparatus with both brakes disengaged.

FIG. 5 is a similar schematic view but illustrating only the dynamic brake engaged.

FIG. 6 is a similar schematic view illustrating both the dynamic and pressure brakes engaged.

FIG. 7 is a fragmentary vertical central transverse sectional view of a landing gear frame equipped with a preferred embodiment of the dynamic and pressure brake apparatus of the present invention.

Figure 8:
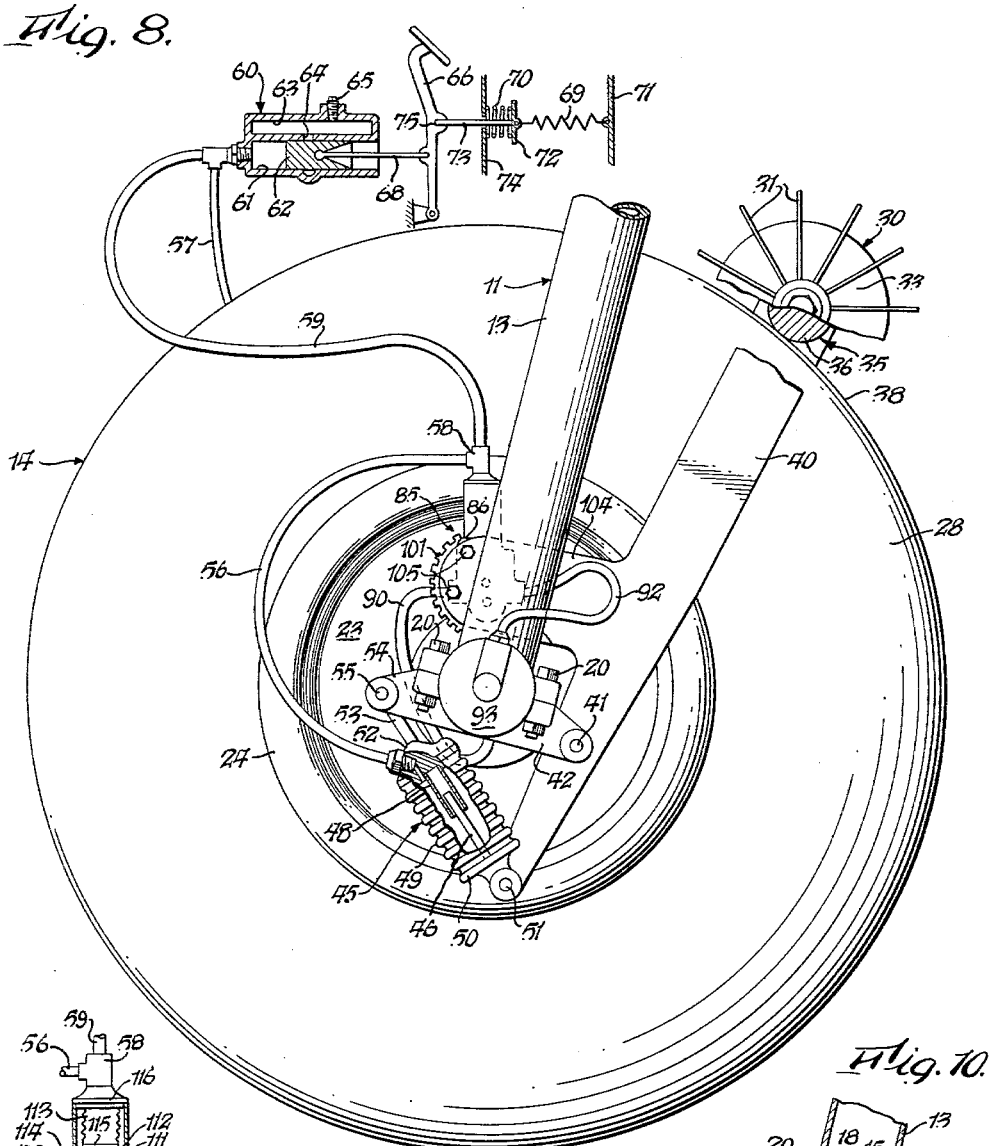
FIG. 8 is a fragmentary end elevational view of the apparatus shown in FIG. 7, viewed from the right end thereof, and showing selective control means associated with the fluid operated elements of the brake means.

Referring to FIGS. 7–10, the numeral 11 represents generally the landing gear frame of an aircraft and is shown specifically as including a pair of laterally spaced tubular legs 12 and 13 arranged on opposite sides of a landing wheel indicated generally at 14. Suitably connected to the lower ends of the legs 12 and 13 is a hollow or tubular non-rotative axle 15. As shown, each end of the axle 15 is slightly reduced in outside diameter as indicated at 16 to be engaged by the upper half of a semi-cylindrical clamp member 18 suitably secured as by welding to the lower end of the corresponding leg 12 or 13, and a lower semi-cylindrical clamp member 19 connected to each upper clamp member 18 by nut and bolt fastening means 20.

The landing wheel 14 has a hub 21 rotatably mounted on the central portion of the axle 15 and ball bearings 22, 22 are shown as interposed between this shaft and hub to provide an antifriction mounting. The hub 21 is shown as having an integral annular web portion 23 which at its outer margin is formed with an integral half rim portion 24. A separate rim portion 25 is removably connected, as by a plurality of nut and bolt fastening means indicated at 26, to the web portion 23 of the wheel. The rim portions 24 and 25 jointly provide a conventional annular mounting for an aircraft tire 28.

Aerodynamic brake means are provided and are arrnged to be driven by the landing wheel 14. As shown, such aerodynamic brake means include a pair of rotary impellers 29 and 30 of the centrifugal compressor type. Each such impeller is shown as comprising a series of circumferentially spaced blades 31 extending radially outwardly from a hub 32 which is radially enlarged centrally of its ends to provide a pair of curved surfaces 33, 33 arranged back to back. When these impellers are rotated, air adjacent the central axis of the impeller is drawn over the curved surfaces 33 and discharged radially outwardly from between adjacent blades 31. The impellers 29 and 30 are shown severally as non-rotatively secured to the outer reduced ends 34 of a shaft indicated generally at 35 and having a central enlarged driving portion 36 adapted to engage the peripheral surface 38 of the tire 28.

The shaft 35 is shown as mounted on a support including a pair of levers 39 and 40 arranged on opposite sides of the landing wheel 14. Each of these levers 39 and 40 is movably mounted intermediate its ends on a pivot pin 41 the axis of which is parallel but eccentric to that of the hollow axle 15. The pivot pins 41 for the levers 39 and 40 are concentric and carried severally by brackets or arms 42 which extend rearwardly from the lower clamping members 19. The levers 39 and 40 are maintained parallel to each other by a spacer rod 43 suitably interposed between and connected to the outer upper ends of these levers which are also severally enlarged to accommodate anti-friction bearings 44, 44 on which the shaft 35 is journalled.

It will be seen that by pivoting the levers 39 and 40 about the pins 41, the enlarged central portion 36 of the shaft 35 is caused to move along a path eccentric to and which will interfere with the circular periphery 38 of the tire 28 so as to bring the shaft into and out of driving engagement with the tire periphery.

Any suitable means for effecting such movement of the aerodynamic brake support levers 39 and 40 may be provided. As shown, such means comprise fluid operated means indicated generally at 45 and 47 operatively interposed between the landing gear frame and the lower end of each of the levers 39 and 40, respectively. More specifically, each such means 45 and 47 includes telescopic rod and sleeve guide elements 46 and 48, respectively, surrounded by a fluid tight bellows enclosure 49. The outer end of the rod 46 and the corresponding end of the bellows 49 are suitably connected to an end head 50 pivotally connected to the lower end of the corresponding lever 39 or 40, as indicated at 51. The other end of the bellows 49 and the sleeve member 48 are suitably connected to an end head 52 which by a rigid rod 53 is pivotally connected to the outer end of a forwardly extending bracket or arm 54, such pivotal connection being indicated at 55. The arm or bracket 54 is a forward extension of the corresponding lower clamping member 19.

Operating fluid flowing into and out of the chamber provided by the bellows 49 and end heads 50 and 52 is handled by a flexible conduit or tubing 56, in the case of the fluid operated means 45, which is shown as suitably secured at one end to the end head 52. The other end of the conduit or tubing 56 is shown as connected to one port of a T 58. Another port of this T is connected via a flexible conduit or tubing 59 to a control piston and cylinder device indicated generally at 60. The other fluid operated means 47 is shown as being connected to the device 60 via a conduit or pipe 57.

The device 60 is shown as including a housing providing a lower cylinder 61 in which a plunger or piston 62 is slidably arranged. The housing also provides an upper fluid reservoir chamber 63 having communication with the cylinder 61 through a port 64. The reservoir chamber 63 may be filled through an opening normally closed by a removable plug 65. The plunger 62 is shown as connected to a foot pedal 66 by a connecting rod 68. This pedal is also connected to a two-stage spring comprising a first spring 69 and a second spring 70. One end of the spring 69 is shown as connected to a fixed support 71 and the other end to a head 72 formed on one end of a rod 73 which extends through an opening in a fixed member 74 and is pivotally connected to the pedal 66 as indicated at 75. The spring 70 is shown as arranged between the head 72 and fixed member 74.

Pressure operated friction brake means are operatively interposed between the landing gear frame 11 and wheel 14. Such means may be of any suitable construction. As shown, such means include a fixed annular abutment member or back-plate 76 extending radially outwardly from an integral sleeve part 78 which surrounds a portion of the hollow shaft 15 on one side of the wheel 14. The sleeve part 78 is shown as non-rotatively secured to the shaft 15 by a key 79. Suitably mounted on the fixed abutment member 76 is an annular housing member 80 formed with an annular chamber 81 in which an annular operating plunger or piston 82 is slidingly arranged. Interposed between the radial portion of the abutment member 76 and the piston 82 are a series of alternately arranged fixed and rotatable brake disks 83 and 84, respectively. The fixed brake disks 83 are keyed to the abutment member 76 and the rotatable brake disks are keyed to the bolts 26.

When pressurized operating fluid is introduced into the chamber 81 to the left of the plunger 82 as shown in FIG. 7, this plunger will clamp the horizontal stack of brake disks 83 and 84 against the abutment member 76 and, therefore, produce a mechanical or friction braking action.

Figure 9:
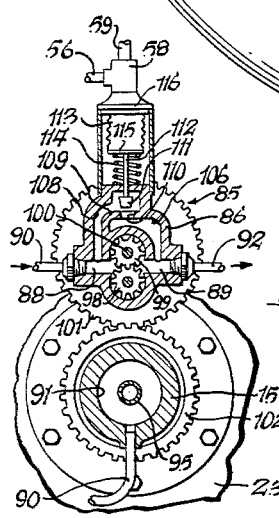
FIG. 9 is a fragmentary vertical sectional view thereof taken on line 9—9 of FIG. 7.
Figure 10:
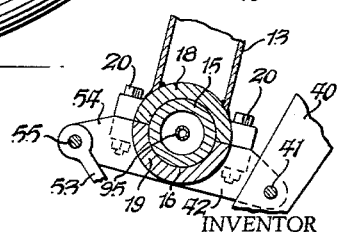
FIG. 10 is a fragmentary vertical sectional view thereof, taken on line 10—10 of FIG. 7.

Means are provided for generating a pressurized operating fluid and for applying the same to the mechanical brake. As best shown in FIG. 9, such means comprise a fluid pump means indicated generally at 85 including a pump body 86 having an inlet 88 and outlet 89. The inlet 88 is shown as connected by a flexible conduit or tubing 90 to the interior 91 of the hollow axle 15 which serves as a fluid reservoir. The outlet 89 of the pump is shown as connected by a flexible conduit or tubing 92 to an end cap 93 suitably secured to one end of the hollow axle 15. The other end of this axle is closed by a similar end cap 94. The end caps 93 and 94 are severally provided with L-shaped passages 87 and 97, respectively, and the opposing ends of these passages communicate with each other by a conduit or pipe 95 arranged centrally of the hollow axle 15 and extending longitudinally thereof. The outer end of the passage 97 in the end cap 94 is connected to the chamber 81 of the mechanical brake means via a flexible conduit or tubing 96.

The pump 85 may be of any suitable construction. As shown, it is of the gear type comprising a pair of cooperating gears 98 and 99 arranged in the usual chambers provided in the body 86 and operatively interposed between the inlet 88 and outlet 89. The gear 99 is fast to a shaft 100 which extends to the exterior of the pump body 86. A gear 101 is fast to the outer end of the shaft 100 and is adapted to be driven by a gear 102. This latter gear 102 is in the form of a ring gear suitably secured to the rotative hub 21 of the wheel 14, as by the machine screws 103. Thus, the ring gear 102 rotates with the wheel 14 and will serve to rotate the gear 101 if it is in engagement therewith.

The pump body 86 and hence the driven gear 101 are mounted on the lever 40. While this may be accomplished in any suitable manner, as shown the lever 40 has a forwardly extending arm 104 which is arranged above the eccentric axis of the pivot pin 41. The pump body 86 is secured to the forward or free end of this arm 104 in any suitable manner as by being bolted thereto, the bolt and nut fastenings of which several are employed being indicated at 105.

It will be noted that the pump means 85 are arranged on the side of the wheel 14 opposite from that on which the mechanical brake means are arranged. This is desired to provide a compact assembly.

Means are provided for controlling the pressure of the output fluid discharged by the pump 85 into the discharge conduit 92 which communicates with the mechanical brake actuating chamber 81. For the purpose of so regulating the pressure, the pump body 86 is shown as provided with a by-pass including a first duct 106 connected to the outlet 89 and a second duct 108 connected to the inlet 88. The ducts 106 and 108 are separated by a horizontal wall 109 having a vertical tapered hole or port 110 therein and variably closable by a vertically movable tapered valve 111 arranged on the lower end of a valve stem 112 extending through the top wall of the portion of the pump body which provides the duct 108.

Movement of the pressure regulating valve 111 and its stem 112 is controlled by a bellows 113 and a return spring 114. The upper end of the valve stem 112 is shown as carrying a horizontal plate 115 which serves as the lower end wall for the bellows 113. The upper end of this bellows 113 is suitably connected to the top wall of a housing 116 so that the interior of the bellows is in fluid communication with the third port of the T 58. The valve spring 114 which is helical surrounds the valve stem 112 and is interposed between the plate 115 and top wall of the pump body 86. The bellows 113 and valve spring 114 are arranged within the housing 116 which is suitably supported on the pump body 86.

Operation

The operation of the braking apparatus can be best understood by referring to FIGS. 1-6.

In FIG. 1, an airplane $A_t$ is illustrated at the point of touchdown on a runway R and after stopping at the end of the landing run the aircraft assumes a position represented at $A_s$. The length of the landing run is represented in ten equal percentage intervals.

If an aircraft upon touchdown has only its friction brake applied, this brake must perform the work represented diagrammatically in the areas illustrated in FIG. 2 wherein the vertical ordinate represents the tire traction force and the horizontal ordinate represents the length of the landing run and also indicates the velocity of run per unit of time. Thus, for example, the area $W_1$ represents the work accomplished in the first second of brake application, the area $W_2$ the work performed in the second second, and the area $W_3$ the work performed in the third second, etc.

This is but by way of background for an understanding of the present inventive concept which is depicted diagrammatically in FIG. 3 wherein the vertical ordinate represents retarding force which is preferably the maximum tire traction force, i.e. at the threshold of skidding and the horizontal ordinate represents the length of the run in constant units of time and also the percentage of the total time for the landing run from touchdown to stop. With both dynamic and pressure brakes operated substantially simultaneously upon touchdown, it will be seen that these brakes share the total work performed. The diagonal line L divides the work areas below this line, attributable to dynamic brake performance, from the upper work areas above this line which represents controlled pressure brake performance. The dynamic brake is allowed to operate in an uncontrolled manner when it is actuated. Since landing wheel speed is highest at touchdown, the braking effort or work performed by the dynamic brake dominates initially over that performed by the pressure brake. However, as the speed of the aircraft decreases and the braking effort of the dynamic brake fades out, the pressure of the fluid operating the pressure brake is increased to compensate and therefore the pressure brake performs an ever increasing proportion of work. Thus, in referring to FIG. 3, the total work performed in a given unit of time during a landing run is represented by the sum of the work area below the diagonal line L, such as the area $W_d$, and the work area above the line L, such as area $W_p$. As time progresses, area $W_d$, being the work performed by the dynamic brake, decreases as the area $W_p$, being the work performed by the pressure brake, increases.

The uncontrolled operation of the dynamic brake and the controlled operation of the pressure brake is represented sequentially in the schematic illustrations of FIGS. 4-6.

Immediately prior to touchdown, the pilot controlled brake pedal 66 is in its off position so that the dynamic and pressure brakes will be disengaged. The dynamic brake is disengaged because its drive shaft 35 is out of engagement with the periphery of the landing wheel tire 28. The pressure brake is not operating because the gears 101 and 102 are out of mesh and therefore the pump 85 is not being operated. This condition of the various parts is illustrated in FIG. 4.

However, immediately upon touchdown, the pilot depresses the pedal 66 against the urging of the spring 69 to the point where the spring 70 is about to pick up. Such movement of the pedal 66 moves the plunger 62 to a position cutting off communication between the chambers 61 and 63 thereby trapping fluid in the chamber 61 and also displacing a portion of such fluid from this chamber into conduit 57 and thence into the bellows means 47, and also into conduit 59, through the T 58 into conduit 56 and thence into the bellows means 45. This expands the bellows means 45 and 47 to swing the levers 39 and 40 about their pivots in a counter-clockwise direction as viewed in FIGS. 4-6 and 8 so as to bring the drive shaft 35 into operative engagement with the landing wheel tire 28. Such engagement rotates the impellers 29 and 30 which move air. The movement of such air requires work and the energy therefor is derived from the rotating landing wheel 14. Because of the drive shaft 35 engaging the tire 28, a braking action upon the wheel 14 is provided.

At the same time, the pump gear 101 is moved into engagement with the wheel driven gear 102 so as to put the pump 85 in operation and thereby enable operation of the pressure brake. The condition of initially engaged dynamic and pressure brakes is depicted diagrammatically in FIG. 5.

From an examination of FIG. 9 it will be seen that during the initial movement of the foot pedal 66, the by-pass valve 111 has remained substantially fully opened so that the pump 85 cannot develop any effective pressure in the pump discharge conduit 92 for operating the pressure brake.

However, as the pilot continues gradually to depress the brake pedal 66, meeting more resistance since spring 70 has been picked up, more and more fluid is displaced from the chamber 61 into the bellows 113 which causes the latter to expand and gradually move the valve 111 into the hole 110 and thereby gradually close off the by-pass for the pump. The effect of this is to gradually increase the pressure of the fluid in the pump discharge conduit 92. This pressurized fluid through the connecting passages 87, 95, 97, 96 and 81 moves the brake piston 82 to clamp the brake disks 83 and 84 and thereby operate the pressure brake. This condition of the parts is represented in FIG. 6.

Release of the brake pedal 66 following stopping of the aircraft will allow dynamic and pressure brakes to assume the unactuated condition represented in FIG. 4.

Instead of manually progressively increasing the pressure of the fluid which operates the pressure operation friction brake by depressing the foot pedal 66, automatic means known to those skilled in the art for the power application of brakes may be employed if desired.

From the foregoing, it will be seen that the present invention provides a method and apparatus for braking an aircraft upon landing which can utilize the full tire traction force enabling the aircraft to be stopped without skidding after a minimum landing run. While modifications in the apparatus may suggest themselves to those skilled in the art, the embodiment shown and described is illustrative and not limitative of the present invention, the scope of which is to be measured by the appended claims.

What is claimed is:

1. In an aircraft, the combination comprising a landing wheel, pressure operated friction brake means for said wheel, aerodynamic brake means of the centrifugal compressor impeller type for said wheel, selectively controlled means arranged to drive said aerodynamic brake means from said wheel, means arranged to pump a fluid upon actuation of said aerodynamic means, selectively controlled means for varying the pressure of the output fluid of such pump means, and means arranged to apply such pressurized output fluid to said friction brake means.

2. In an aircraft, the combination comprising a landing wheel, and aerodynamic brake means arranged to be driven by said wheel including an arm pivotal about an axis eccentric to that of said wheel, a rotary impeller rotatably arranged on said arm, a rotary drive member arranged for rotation about an axis substantially parallel to the wheel axis and drivingly associated with said impeller and adapted to engage the periphery of said wheel and means arranged to pivot said arm about said eccentric axis.

3. In an aircraft, the combination comprising a landing wheel, and aerodynamic brake means arranged to be driven by said wheel including arms opposite sides of said wheel and pivotal about an axis eccentric to that of said wheel, a shaft member journalled on said arms remote from said eccentric axis for rotation about an axis parallel thereto and having a portion extending transversely of the periphery of said wheel and adapted to drivingly engage the same, an impeller fast to at least one end of said shaft member and means arranged to pivot said arms about said eccentric axis.

4. In an aircraft, the combination comprising a landing wheel, and aerodynamic brake means arranged to be dirven by said wheel including a pair of arms, one on each side of said wheel, and pivotal about a common axis eccentric to that of said wheel, a shaft member journalled on said arms remote from said eccentric axis for rotation about an axis parallel thereto and having a portion extending transversely of the periphery of said wheel and adapted to drivingly engage the same, an impeller fast to each end of said shaft member and arranged on the side of the corresponding one of said arms opposite from said wheel and means arranged to pivot said arms about said eccentric axis.

5. In an aircraft, the combination comprising a landing gear frame, a landing wheel rotatably mounted on said frame, aerodynamic brake means arranged to be driven by said wheel including a rotary impeller, a support for said impeller movably mounted on said frame and means for moving said support from one position in which said impeller is out of driving association with said wheel to a second position in which said impeller is in driving association with said wheel, pressure operated friction brake means operatively interposed between said frame and wheel, fluid pump means carried by said support and having an inlet and outlet, means for driving said pump means including a drive element which rotates with said wheel and a driven element carried by said support, said drive and driven elements being disengaged when said support is in said one position but engaged when said support is in said second position, means connecting said inlet to a fluid reservoir, means connecting said outlet to said friction brake means, and fluid operated means for regulating the pressure of fluid in said outlet and thereby controlling the operation of said friction brake means.

6. In an aircraft, the combination comprising a landing gear frame, a landing wheel rotatably mounted on said frame, aerodynamic brake means arranged to be driven by said wheel including a rotary impeller, a support for said impeller movably mounted on said frame and fluid operated means for moving said support from one position in which said impeller is out of driving association with said wheel to a second position in which said impeller is in driving association with said wheel, pressure operated friction brake means operatively interposed between said frame and wheel, fluid pump means carried by said support and having an inlet and outlet, means for driving said pump means including a drive element which rotates with said wheel and a driven element carried by said support, said drive and driven elements being disengaged when said support is in said one position but engaged when said support is in said second position, means connecting said inlet to a fluid reservoir, means connecting said outlet to said friction brake means, fluid operated means for regulating the pressure of fluid in said outlet, and common control means for both said fluid operated means.

7. In an aircraft, the combination comprising a landing gear frame including a hollow shaft, a landing wheel rotatably mounted on said shaft, aerodynamic brake means arranged to be driven by said wheel including a rotary impeller, a support for said impeller movably mounted on said frame and means for moving said support frame from one position in which said impeller is out of driving association with said wheel to a second position in which said impeller is in driving association with said wheel, pressure operated friction brake means operatively interposed between said frame and wheel, fluid pump means carried by said support and having an inlet and outlet, means for driving said pump means including a drive element which rotates with said wheel and a driven element carried by said support, said drive and driven elements being disengaged when said support is in said one position but engaged when said support is in said second position, means connecting said inlet to the interior of said shaft which serves as a fluid reservoir, means connecting said outlet to said friction brake means, and means for controlling the pressure of fluid in said outlet and thereby controlling the operation of said friction brake means.

8. In an aircraft, the combination comprising a landing gear frame including a hollow shaft, a landing wheel rotatably mounted on said shaft, aerodynamic brake means arranged to be driven by said wheel including a rotary impeller, a support for said impeller movably mounted on said frame and means for moving said support from one position in which said impeller is out of driving association with said wheel to a second position in which said impeller is in driving association with said wheel, pressure operated friction brake means arranged on one side of said wheel and operatively interposed between said frame and wheel, fluid pump means arranged on the other side of said wheel and carried by said support and having an inlet and outlet, means for driving said pump means including a drive element which rotates with said wheel and a driven element carried by said support, said drive and driven elements being disengaged when said support is in said one position but engaged when said support is in said second position, means connecting said inlet to the interior of said shaft which serves as a fluid reservoir, means connecting said outlet to said friction brake means including a first conduit leading from said outlet to one end of said shaft, a second conduit leading from said friction brake means to the other end of said shaft and a third conduit arranged within said shaft and extending between the ends thereof and establishing communication between said first and second conduits, and means for controlling the pressure of fluid in said outlet and thereby controlling the operation of said friction brake means.

9. In combination with an axle having a tire and wheel unit journalled on said axle, and a support member for said axle, support means pivotally secured to said support member, a turbo-brake operatively carried by said support means to draw in air from adjacent areas and perform work thereon, said turbo-brake including a pair of axially outwardly open impellers and a shaft therefor, said turbo-brake impellers being secured to and carried by said shaft adjacent opposite ends thereof and including generally radially extending vanes thereon, said shaft intermediate said impellers being of a length greater than the width of said tire, and control means operatively connected to said support means to force said impeller shaft against said tire to produce rotation of said impellers and braking action on said tire and wheel unit when it is rotating.

References Cited by the Examiner
UNITED STATES PATENTS

| | | | |
|---|---|---|---|
| 2,241,189 | 5/1941 | Dick | 188—86 |
| 2,355,026 | 8/1944 | Koppen | 244—111 |
| 2,845,148 | 7/1958 | Sturgill | 188—106 X |

FERGUS S. MIDDLETON, *Primary Examiner.*

MILTON BUCHLER, A. JOSEPH GOLDBERG,
*Examiners.*